United States Patent [19]

de Brabander et al.

[11] 4,435,078

[45] Mar. 6, 1984

[54] ELECTRONIC LIGHT BEAM TESTER

[75] Inventors: Louis F. de Brabander, Wezembeek-Oppem; Luc K. Van Linthout, Leuven, both of Belgium

[73] Assignee: Fonds d'Etudes pour la Securite Routiere A.s.b.l., Brussels, Belgium

[21] Appl. No.: 276,183

[22] Filed: Jun. 22, 1981

[30] Foreign Application Priority Data

Jun. 27, 1980 [BE] Belgium ............................ 201.209

[51] Int. Cl.³ .............................................. G01V 1/42
[52] U.S. Cl. ..................................... 356/121; 356/222
[58] Field of Search ................................ 356/121–123, 356/222, 229

[56] References Cited

U.S. PATENT DOCUMENTS 3,515,483  6/1970  Irwin .................................. 356/121
3,520,618  7/1970  Bentley .............................. 356/121
3,531,705  9/1970  Nussmeier ......................... 356/122

FOREIGN PATENT DOCUMENTS 783144   5/1972  Belgium .
807541  12/1973  Belgium .

Primary Examiner—William H. Punter
Attorney, Agent, or Firm—Bacon & Thomas

[57] ABSTRACT

The invention concerns an opto-electrical device for measuring the orientation and the characteristic luminous intensities of light beams.

The device is essentially characterized by containing at least: a screen on which photo-electric transducers are situated, a positioning device for the screen according to a reference direction, amplifiers and voltage dividers which give signals proportional to the characteristic luminous intensities sensed by the transducers and comparators for comparing the ratios between the voltage and between the maxima of sub-sets of voltages.

10 Claims, 5 Drawing Figures

ELECTRONIC LIGHT BEAM TESTER

BACKGROUND OF THE INVENTION

The present invention concerns an opto-electronical electronic apparatus which can be used to check or to measure directly, without calculations or additional corrections, the orientation of light beams and their luminous intensity, in one or several characteristic directions by setting up the apparatus at any distance in front of the light beam emitter.

One of the various applications of the invention is to measure or to check the orientation and the luminous intensity of projectors or signalling lights either fixed or mounted on vehicles.

The traditional method to measure the orientation of a light beam consists in observing its shape and its position on a screen set up at a large distance in front of the emitter. The luminous intensity I in a given direction can be calculated on the basis of the illumination E (in lux) on the screen at the place corresponding to this direction and can be expressed as follows:

$$I = E.R^2$$

where R (in meters) is the distance of the screen with regard to the emitter.

In order to make these operations more practical, apparatus containing a converging lens are known. This lens reproduces the image of the light beam on a screen put close to its focal plane. The image obtained is similar to the image on a large distance screen.

In particular, such optical apparatus for car headlights have been standardized in several countries, one of which is Belgium (standard NBN No. 612).

The luminous intensity I in a given direction can then be calculated in function of the illumination E of the corresponding point on the screen and is expressed as follows:

$$I = E.F^2$$

where F (in meters) is the focal distance of the lens.

A photo-electric transducer placed on the screen allows one to measure the luminous intensity in the corresponding direction whereby the measure is independent of the distance to the emitter in so far as all the rays coming from the emitter in this direction are received by the lens.

By placing several photo-electric transducers on the screen, it becomes possible to compare the luminous intensities in different directions and consequently to measure the orientation of a light beam.

The following comparisons are known up to now:

For symmetrical light beams with regard to two perpendicular planes (the intersection of which makes the light beam axis): four photo-electrical cells, one in each quadrant, may be placed on a movable screen with regard to the light beam (or on a immovable screen with regard to the light beam reflected by means of a movable mirror e.g.). Detecting the balance between the electrical currents generated by the four cells by means of zero detectors allows one to measure the orientation of the light beam.

For light beams presenting a fast gradient of the luminous intensity in the vicinity of a geometric place that we will call "cut-off", the photo-electrical cells may be placed in the neighborhood of this cut-off and:

either the difference of illumination between these cells can be measured;

or the illumination of two cells placed like this can be compared to a linear equation:

$$I_2 = aI_1 + b$$

where $I_1$ and $I_2$ are the luminous intensities in the corresponding directions 1 and 2, a and b being predetermined coefficients that are finite and not equal to zero.

These realizations have the following inconveniences:

either they require that the operator carry out a measure and then one cannot tell immediately and clearly whether the orientation of the light beam is within the tolerances of not, or they give a result not only depending on the orientation of the light beam but also on the absolute values of the luminous intensities. In practice, these values are often variable, among other things because of the supply voltage variations of the lamps.

Besides, it is not possible to check whether the shape of the light beam is satisfactory or not.

Already for a long time the need has been felt to measure or to check in a direct and easy way the shape and the exact orientation of different light beams.

The best known example is that of the car headlights and more precisely that of the driving lights and the passing lights. Indeed, according to the 1968 Vienna Convention on Road Traffic:

the driving lights must be capable to illuminate the road adequately over at least 100 m ahead of the vehicle, the passing lights must be capable to illuminate the road adequately over at least 40 m ahead of the vehicle, without causing undue dazzle or inconvenience to on coming drivers and other road-users.

That is why standards have been laid down:

for the "American" headlights: SAE standards for the "European" headlights: Rules annexed to the 1958 Geneva Agreements concerning the adoption of uniform Conditions of Approval for Motor Vehicle Equipment and Parts.

These standards prescribe minimum luminous intensities in the directions to be illuminated and maximum luminous intensities in the directions in which dazzle is to be feared. These luminous intensities must be measured in well-defined laboratory conditions during type approval tests on headlights.

These measures cannot be carried out on vehicles up till now by lack of adequate instruments. Indeed, such instruments must be adapted at the practical working conditions as they are, for example, in the inspection stations for motor vehicles.

Consequently, one of the objects of the present invention is to provide a measuring—and checking—apparatus for motor vehicle headlights for allowing one to ascertain immediately whether a headlight fulfils the requisite conditions or not, being it understood that the application is not limited to this specific case.

BRIEF DESCRIPTION OF THE INVENTION

For this, the invention includes a combination of:

a screen comprising a set of photo-electrical transducers placed at a large distance in front of the headlight to be measured or within an optical block in the vicinity of the focal plane of a converging lens;

a device for the positioning of the said screen or the said optical block in front of the headlight to be checked, according to a direction aligned on a reference direction of the vehicle, to which corresponds a reference position of the screen;

amplifiers or voltage dividers, or both, connected to the said photo-electrical transducers giving an output voltage according to predetermined preoportionality factors and each establishing a measure of the luminous intensity in each corresponding direction viewed by the transducer;

comparator devices that, within the set of the said electric voltages, compare them mutually either separately or by comparing the maximum values of certain sub-sets or fractional combinations of the voltage, in order to supply digital signals corresponding to "smaller" or "larger" values, which signals are available for the direct display of the results on a control board or for their transmittal to recorders or other exploitation means;

indicators operated by some of the said electric voltages which provide measurements of the luminous intensity in the directions of the transducers.

In addition, the invention also includes a device to check the positioning of the optical block. This device consists of optical receivers placed around the said lens;

an optical or electric transmission of the optical signals received in this way;

a display of these signals on the control board in order to estimate the relative position of the input lens with regard to the headlight under test.

These signals can also be exploited to operate an automatic positioning system of the optical block.

The present invention inherits all the advantages of the candlepowermeter—comparators as described in the Belgian Pat. No. 807.541 and introduces the following new advantages:

the ratios between the luminous intensities do not depend on the supply voltage of the headlights under test since for a given headlight the intensities in the different directions all vary proportionally;

the ratios between the luminous intensities are also independent of the colour: therefore, a spectral correction is superfluous except in the case in which absolute and precise measurements of the luminous intensites would be necessary for headlights of which the luminous spectrum is not known.

Other objects and characteristics of the present invention will become clearer with the following detailed description and the added drawings representing particular realizations of the invention. It should be understood, however, that the drawings only illustrate the description and do not intend to define the limits of the invention.

This example concerns the verification and the measurements of driving beams and passing beams of motor vehicle headlights.

DETAILED DESCRIPTION OF PREFERRED EMBODIMENT

Figure 1:
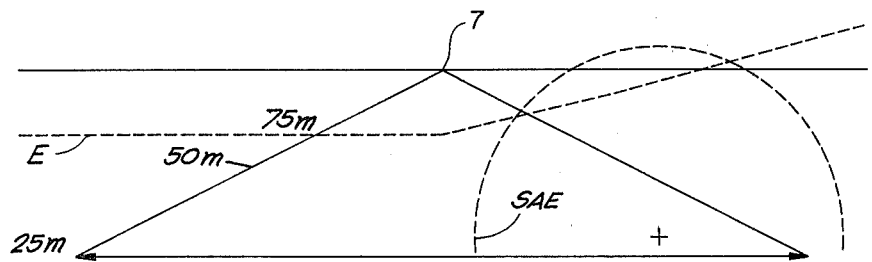
FIG. 1 shows in dotted lines, with regard to a 3 m wide roadline the cutoff margin of the intense illuminated zones for European (E) and American (SAE) passing lights placed at 0,75 m above the ground in the middle of the roadlane.
Figure 2:
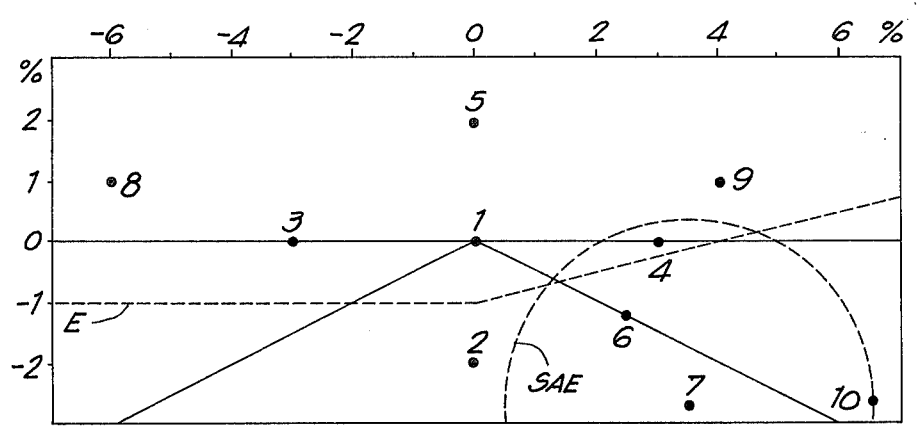
FIG. 2 shows a selection of ten characteristic directions relating to the conditions imposed on driving lights and passing lights concerning either the direction tolerances or the luminous intensities.
Figure 3:
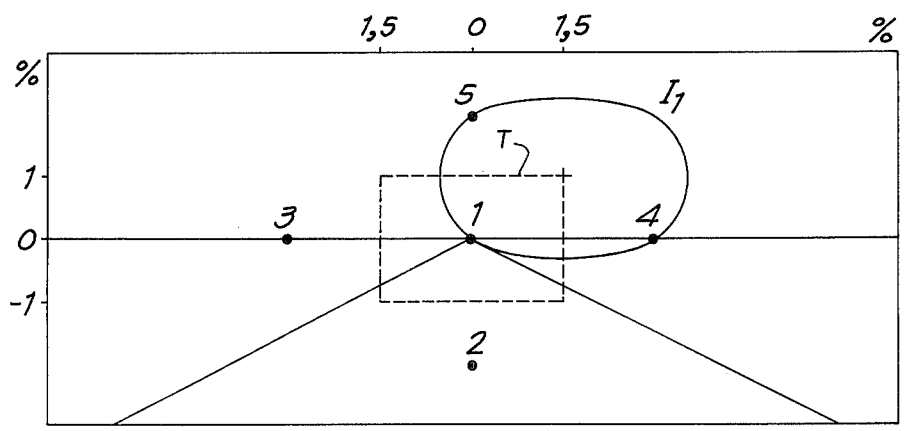
FIG. 3 shows an iso-candela locus of a driving light whose eccentricity is on the limit.

For the driving light, the standards foresee a light beam centered on the direction 1 of the FIGS. 1, 2 and 3. Nevertheless, a tolerance is allowed on this direction limited to (in Belgium e.g.):

a 1% shift in inclination a 1.5% shift laterally.

The tolerance zone on the axis is indicated by means of a dotted rectangle T in FIG. 3.

The directions 2, 3, 4 and 5 indicated on FIG. 3 correspond to shifts that are the double that of the tolerances.

Thus, the following criteria for the luminous intensities I can be used, whereby the directions are indicated as indices:

$$I_1 \geq I_2$$

$$I_1 \geq I_3$$

$$I_1 \geq I_4$$

$$I_1 \geq I_5$$

in this way, it can be checked whether the iso-candela locus passing through direction 1 contains one of the directions 2 to 5.

In limit cases, the center of the locus diverges from direction 1 with a distance equal to the tolerance. This case is represented by FIG. 3.

For the passing beams, five additional characteristic directions are indicated on FIG. 2:

direction 6 being the center of the zone in which the largest luminous intensities are required for the European lights, direction 7 being the equivalent center for the American lights, direction 8 in which the dimmest light intensity is required for the European lights, direction 9 being—together with the directions 1 and 3—at 1% inclination above the ideal position of the cut-off border of the European lights, direction 10 being at 3% shift to the right of direction 7.

From the European and American standards concerning the minimal and maximal luminous intensities, the following conditions covering these different standards all together can be deduced:

$$I_2 \geq 8I_8$$

Max $(I_6, I_7) \geq$ Max $(6I_1, 8I_3, 6I_9)$ That is, the maximum value of $I_6$ or $I_7$ is equal to the largest of 6 $I_1$, 8 $I_3$ or 6 $I_9$.

Furthermore, tolerating a 1.5% lateral shift, the following conditions can be derived in the same way as those for the driving beam:

$$\mathrm{Max}(I_6,I_7) \geq I_2 \quad I_7 \geq I_{10}$$

As these conditions turn out to be too severe in practice, a protection threshold I° will be introduced against ambient lighting as well as severity coefficients as parameters a, b ... h less than unity (one).
The criteria become then:
for the driving beams:

$$I_1 \geq aI_2 + I_o$$

$$I_1 \geq bI_3 + I_o$$

$$I_1 \geq cI_4 + I_o$$

$$I_1 \geq dI_5 + I_o$$

for the passing beams:

$$\tfrac{1}{8}I_2 \geq e(I_8)$$

$$\tfrac{1}{8}\mathrm{Max}(I_6, I_7) \geq f\mathrm{Max}(\tfrac{3}{4}I_1, I_3 \tfrac{3}{4}I_9)$$

That is, the maximum value of $I_6$ or $I_7$ is equal to f times the maximum of any one of $\tfrac{3}{4} I_1$, $I_3$ or $\tfrac{3}{4}$ $$\mathrm{Max}(I_6, I_7) \geq gI_2$$

$$I_7 \geq hI_{10}$$

The severity coefficient expressed in the formulas above for the driving and passing beams (i.e., a, b, c, ...) represent calibrated proportionality factors used to multiply output signals from the transducers to obtain selected product signals. The coefficients, when used with $I_o$, enable the measuring system to be used with lights having various luminous intensities. Also, it will be seen that the formulas given above express certain ratios between some product signals and the maximum value of certain sub-sets of the signals (i.e., the maximum value of $\tfrac{1}{8} I_6$ or $I_7$ is greater than the maximum of $f(\tfrac{3}{4} I_1, I_3 \text{ or } \tfrac{3}{4} I_9)$.

Figure 4:
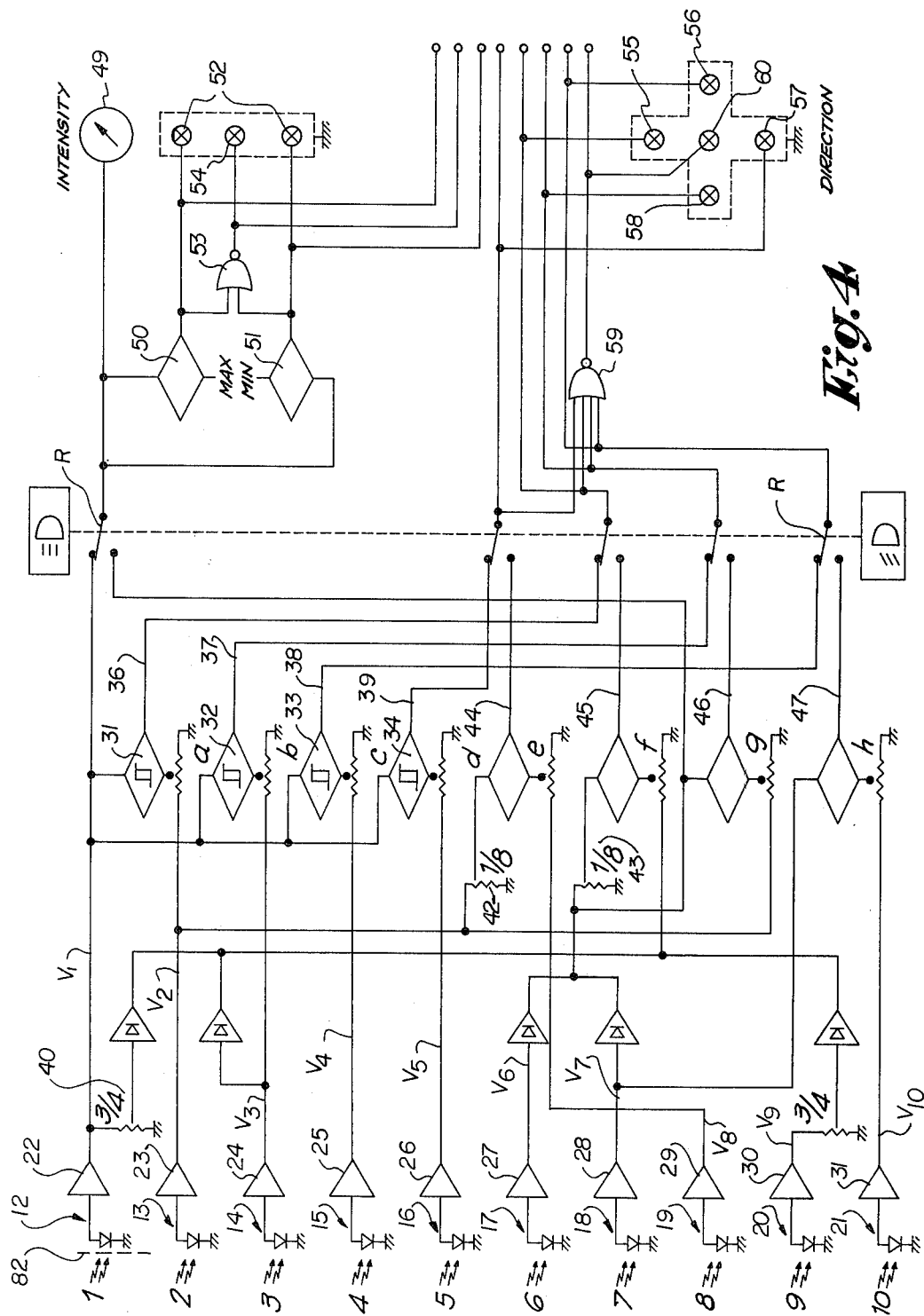
FIG. 4 shows an example of electronic block-diagram of the apparatus.

These criteria are electronically checked in a relatively simple way, e.g. by the setting-up of FIG. 4.

Ten photo-electrical transducers 12–21 situated on the screen at the places corresponding to the directions 1 to 10, give through their amplifiers 22–31 voltage signals in lines $V_1$–$V_{10}$. Proportional to the light intensities $I_1$ to $I_{10}$.

Through the voltage dividers a, b, c, d and the outputs of the amplifiers 22–31 are connected to hysteresis comparators 31–34, the reversal thresholds of which are adjusted to value $I_o$. That is, no output is produced from comparators a–d until at least the $I_o$ threshold is reached.

Thus four digital voltage signals in lines 36–39 are obtained, indicating whether the criteria for the driving beams are fulfilled or not.

For the passing beams in directions 6–11, the operations are similar, including voltage dividers e–h except that the four voltage divider (comparators) have no hysteresis comparator, and that two voltage sub-sets ($V_6$, $V_7$) and ($\tfrac{3}{4} V_1$, $V_3$, $\tfrac{3}{4} V_9$) which represent respectivey ($I_6$, $I_7$) and ($\tfrac{3}{4} I_1$, $I_3$, $\tfrac{3}{4} I_9$) in the formulas discussed above, pass through maximum detectors first. The values $\tfrac{3}{4} V_1$ and $\tfrac{3}{4} V_9$ are obtained via variable $\tfrac{3}{4}$ voltage dividers 40,41, the comparison being made by means of two variable $\tfrac{1}{8}$ voltage dividers 42,43 and the voltage dividers: e, f, g and h, the outputs of which are digital signals transmitted by lines 44, 45, 46 and 47. The values of $\tfrac{3}{4} V_1$, $\tfrac{3}{4} V_9$, $\tfrac{1}{8} V_2$ etc. (or their equivalent $\tfrac{3}{4} I_1$, $\tfrac{3}{4} I_9$, $\tfrac{1}{8} I_2$, etc. may be termed "calibrated proportionality values", and the relationships expressed in the formulas set forth above may be expressed herein as "ratios".

The exploitation can be carried out in different ways. So e.g. on FIG. 4, according to the position of the "driving lights/passing lights" switch R, either $I_1$ or Max ($I_6$, $I_7$) is indicated on a reading instrument 49.

These values are compared to the prescribed minimum and maximum limits by two comparators 50, 51, switching on telltales 52. An NOR gate 53 controls a third tell-tale 54, if the value is situated between the limits.

The outputs of the comparators 50, 51, checking whether the criteria concerning the direction are fulfilled or not, are also related to four tell-tales 55–58 and to an NOR gate 59 with a tell-tale 60.

These five tell-tales can be integrated into the control board in order to provide a clear indication about the sense in which the light beam diverges from the ideal direction.

The different logical outputs can also be used for recording or storage and electronic data processing, e.g. in order to compile statistics.

The exploitation can also be done in the reverse way by increasing the value of the parameters a, b, ... h up to a level at which its only possible to fulfil the criteria for a single orientation of the headlight. Thus the indication of the displacement of the transducer screen 62, or of the rotation of the optical block B allows a precise measurement of the orientation of the headligth.

Figure 5:
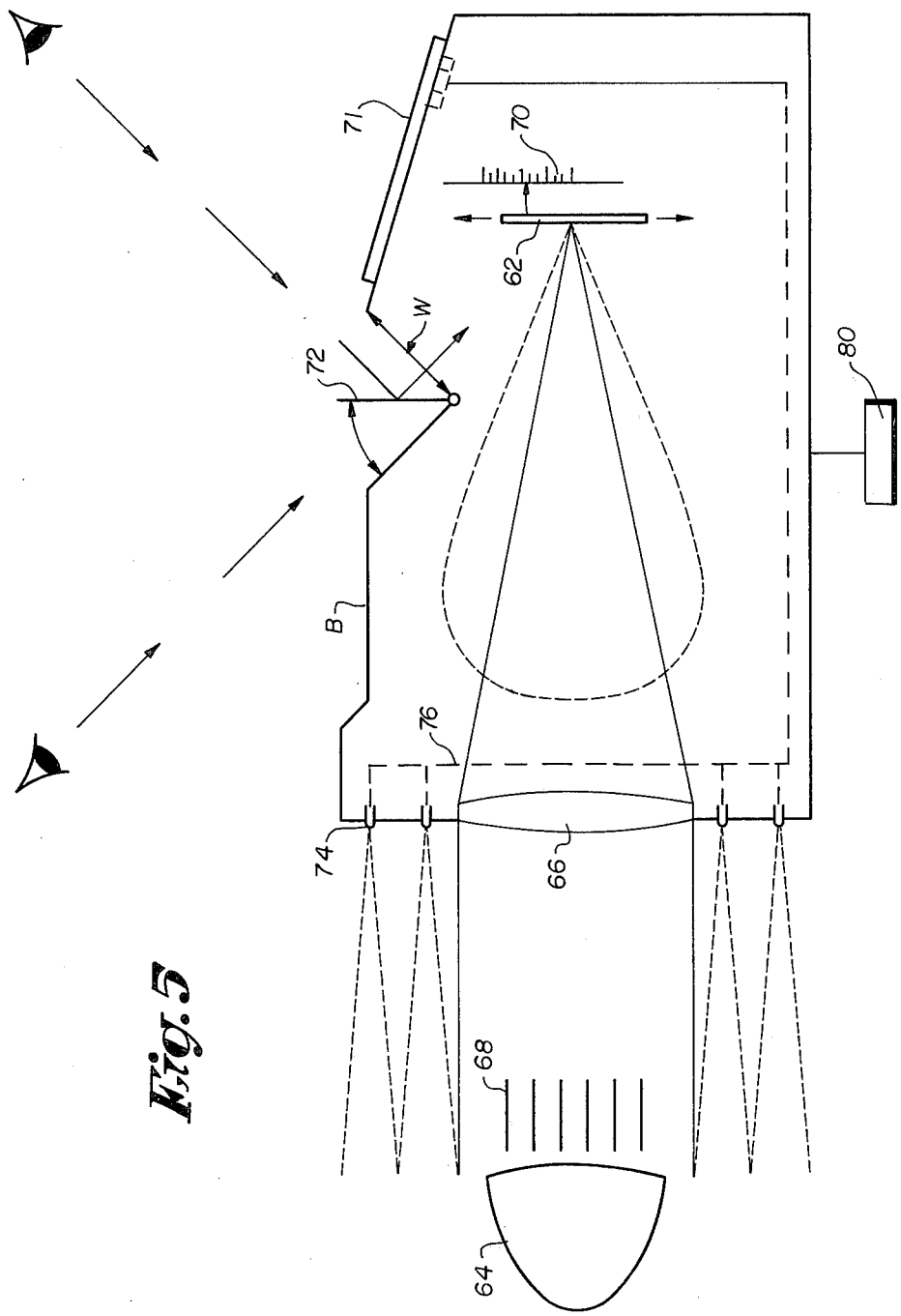
FIG. 5 shows the section of an optical block and schematizes on optical spacial distribution of the photo-electrical transducers and of the optical receivers of the position checking-device.

Another specific application is possible, as far as European passing lights are concerned: the height for which $$\tfrac{1}{8}\mathrm{Max}(I_6, I_7) = f\mathrm{Max}(\tfrac{3}{4}I_1, I_3, \tfrac{3}{4}I_9)$$

is obtained, establishes a measurement of the height of the cut-off according to the ISO 4182 standard. This equation is in fact a definition of a conventional cut-off position for a selected or given value of f. Such a definition is of great value, the more so as an absolute definition of this cut-off had not been found so far. The system incorporating the invention is shown in FIG. 5 where an optical block or housing B includes the screen 62 with the transducers, a lens 66 for focusing the light rays 68 from a headlamp 64 on the screen 62. The screen 62 is movable as shown by the arrows and an indicator schematically shown at 70 shows the position of the screen 62. A control panel 71 is observable on the top of the unit B. Any suitable device can be used to enable the operator and observer to move the screen 52.

In order to facilitate the operation of the apparatus shown in FIG. 5, it is interesting to be able to observe the screen 62 from behind as well as from the front of the apparatus B while measuring or checking. It is therefore necessary to provide the optical block B with an observation window N and a adjustable mirror 72, as indicated in FIG. 5.

To facilitate the centering of the optical block B into the headlight, optical receivers 74 are placed around the input optical system, the directivity of which is such that the sensible zones come into touch with each other approximately at the normal distance of the headlight measured. The simplest instrument contains optical fibres 76 with an appropriate optical head 74, as indicated on FIG. 5, the other end being connected to the control board in such a way that the display geometrically corresponds to the position around the optical system. The operator can thus easily check the position of the optical block in front of the headlight, without the latter being directly visible. If desired, the optical block B can be automatically positioned in front of the headlamp 64 by a drive system 80 that is responsive to the signals from the optical receivers 74. In addition, the transducers 12-21 may be provided with optical filters 82 to make their spectral sensitivity similar to that of the human eye.

As numerous variants are possible, it goes without saying that this invention is not limited to the possible applications quoted above as examples and shown on the drawings annexed.

What we claim is:

1. A device for checking the orientation and luminous intensities of a light beam comprising, in combination:

a screen having a set of photocell transducers spaced apart from each other in selected lateral directions, the transducers arranged to produce individual output electrical signals representative of the intensity of light striking the respective transucers, and including means for orienting the screen relative to a reference direction;

means for processing at least selected ones of said transducer signals to obtain a product signal representative of said selected transducer signals multiplied by a calibrated (constant) proportionality factor;

means for combining and processing at least selected sets of said transducer signals to produce sub-set signals;

means for comparing at least some of said product signals with said sub-set signals to produce comparator signals representative of the relative strength ratio (i.e., greater or lesser) between certain ones or sets of said product signals and certain ones or sets of said sub-set signals;

means for directing said comparator signals to an output utilization means; i.e., a visual display.

2. A device according to claim 1, wherein said electrical signals comprise output voltages, said means for processing the selected transducer signals incudes voltage dividers for producing said product signals.

3. A device according to claim 2, said voltage dividers including variable resistances, whereby said calibrated (constant) proportionality factors can be varied by varying the value of said resistances.

4. A device according to claim 1 or 2, including an optical lens for focusing said light beam; and an optical block assembly for supporting said screen at approximately the focal point of said light beam.

5. A device according to claim 4, including a scale for indicating the displacement of said screen relative to a reference direction.

6. A device according to claim 1, said comparator signals being supplied to indicators for showing the luminous intensities corresponding to said comparator signals and said sub-set signals being supplied to indicators to show maximum values of the sub-set signals; and optical filters located between said transducers and light beam to make the spectral sensitivity of said transducers similar to that of the human eye.

7. A device according to claim 1, wherein one of said photoelectric transducers is selected in the desired direction of maximum light intensity, and other transucers are symmetrically located around this direction at distances proportional to preselected tolerances, said comparing means being arranged to compare the luminous intensity in the desired direction of maximum intensity with the luminous intensities in the directions of said other transucers, whereby the symmetry of said light beam can be measured.

8. A device according to claim 1, wherein said photoelectric transucers are disposed on opposite sides of predetermined cutoff margins between a lighted zone and an obscured zone at distances proportional to selected orientation tolerances in desired first directions of maximum illumination and obscuration, and in other directions where minimum illumination and obscuration limits are imposed; said comparing means being arranged to compare the ratios between the luminous intensities in said directions or the maxima of some ratios of the luminous intensities in the directions of sub-sets of the transducers.

9. A device according to claim 5, including optical receivers around the said lens for receiving portions of the light beam that are peripheral to the lens, and indicators for indicating the intensity of light picked up by said receivers.

10. A device according to claim 5, including means for automatically positioning said lens in front of said light beam and means responsive to the light intensities received by said optical receivers for controlling said automatic positioner.

* * * * *